Oct. 27, 1942.    H. M. WOLFSON    2,299,867
CALIBRATING APPARATUS FOR TEMPERATURE REPORTING DEVICES
Filed Jan. 10, 1939
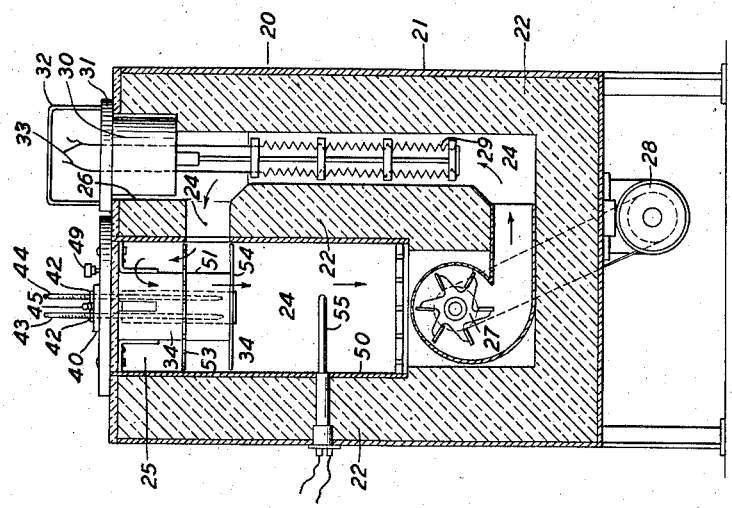
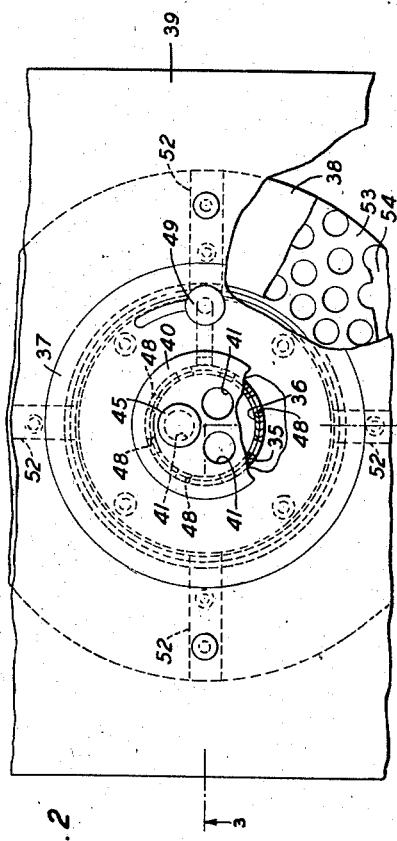
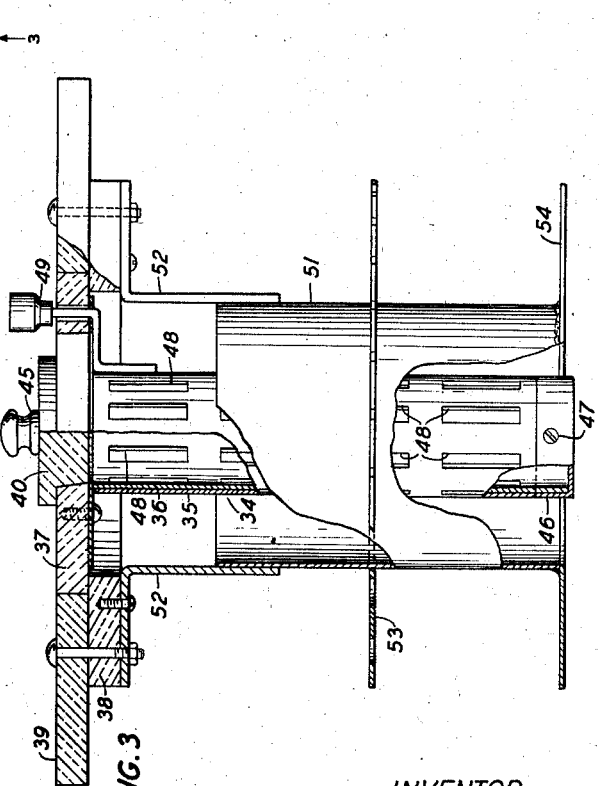
INVENTOR
H. M. WOLFSON
BY
E. R. Nowlan
ATTORNEY Patented Oct. 27, 1942

2,299,867

UNITED STATES PATENT OFFICE 2,299,867

CALIBRATING APPARATUS FOR TEMPERATURE REPORTING DEVICES

Henry M. Wolfson, New York, N. Y., assignor to Western Electric Company, Incorporated, New York, N. Y., a corporation of New York Application January 10, 1939, Serial No. 250,129

6 Claims. (Cl. 73—151)

This invention relates to calibrating apparatus for temperature reporting devices, and more particularly to apparatus for calibrating temperature devices such as thermometers, thermocouples and the like.

In the calibration of such devices, for example, it is necessary to provide means whereby some medium in contact with the heat sensitive portion of the device, e. g. the bulb of a fluid thermometer or the "hot" juncture of a thermocouple, may be brought to and maintained for a predetermined time at a predetermined temperature.

An object of the present invention is to provide a simple, effective, accurate and reliable apparatus for subjecting a device of the character described to a heat transfer medium which can be rapidly and conveniently brought to any predetermined temperature within a considerable range and maintained at such temperature for the necessary period of time.

With the above and other objects in view, the invention may be embodied in an apparatus for calibrating laboratory glass and mercury thermometers of the ordinary straight rod-shaped form with a mercury bulb at the lower end, which apparatus may comprise a housing of heat insulating material having a chamber therein containing heated air or other fluid heat transfer medium within the chamber, and an auxiliary housing located in the chamber and in the current of the medium and having adjustable means to admit the medium to or to debar the medium from the interior of the auxiliary housing, the auxiliary housing being also provided with means to receive and hold both a thermometer to be calibrated and a comparison standard thermometer with their bulbs within the auxiliary housing and their calibrated stems outside.

Other objects and features of the invention will appear from the following detailed description of one embodiment, taken in connection with the accompanying drawing in which the same reference numerals are applied to identical parts in the several figures and in which Fig. 1 is a view in central vertical section of an apparatus constructed in accordance with the invention;

Fig. 2 is an enlarged partial plan view thereof; and

Fig. 3 is a section of the auxiliary housing on the line 3—3 of Fig. 2.

In the embodiment of the invention herein disclosed, a body or housing 20 comprises a sheet metal outer frame 21 supporting a main body structure 22 of heat resistant material, which latter may be asbestos, concrete, asbestos blocks, brick, baked ceramic material or any suitable substance. An annular chamber 24 is formed within the body 22 as shown in Fig. 1, and has two upward extensions or openings 25 and 26 through the top.

A fan or blower 27 of any approved and suitable construction is positioned in the lower part of the chamber 24 and drives the air in the chamber around the chamber as indicated by the arrows. This blower 27 may be conveniently driven by any suitable means such as a motor 28. The annular form of the chamber 24 is an aid to smooth operation; but a chamber without any transverse partition may also be used.

A heating device 29 is located in the right hand vertical part of the chamber 24 to heat the air driven over it by the fan 27. This device 29 is shown as an electrically energized heating coil, although it might be of any other suitable nature such as a coil of pipe fed from outside by any suitable means with a heating or cooling fluid such as hot oil or brine, for example. The device 29 is supported on and removable with a plug or lid 30 having a flange 31 to close the opening and with a handle 32. The leads 33 for the coil 29 may conveniently be brought out through the lid 30. If low temperatures are in question instead of high temperatures, the coil 29 will obviously be a coil of pipe fed with chilled brine or the like.

The upper portion of the left hand vertical part of the chamber 24 and the opening 25 are together formed to receive an auxiliary removable housing 34 comprising two telescopically interfitted sheet metal cylinders, the exterior numbered 35 and the interior 36. The inner cylinder 36 is secured, by means of an integral everted flange at its upper end and suitable screws or the like, to a flat annulus 37 of heat insulating material which in turn is removably supported on a larger similar annulus 38 secured to the under face of a plate 39 also of heat insulating material. The plate 39 is formed with a central aperture to receive the removable annulus 37, and itself rests on the top face of the main housing 20 and supports the housing 34 pendent in the opening 25 and chamber 24. A removable plug or stopper 40 is used to close the central aperture of the annulus 37 and is provided with a plurality of vertical bores 41 to receive bored corks or rubber stoppers or the like 42 for holding thermometers 43 and 44. Any unused bore 41 can be closed with a solid stopper as indicated at 45.

An unperforated cup 46 closes the bottom of the inner cylinder 36, being secured thereto in any convenient manner, as by screws 47. The up-turned edge of this cup 46 serves to support the outer cylinder 35. Both cylinders are formed with a plurality of apertures 48 so dimensioned and arranged that the apertures of the outer cylinder 35 can be made to match the apertures of the inner cylinder or the apertures of each can be closed by the inter-aperture portions of the other by rotating the outer cylinder on the inner.

To effect this rotation conveniently a handle 49 is secured to the outer cylinder and brought up through an appropriate arcuate slot in the annulus 37.

The opening 25 and the part of the chamber 24 in which the last described structure is positioned are preferably lined with a smooth cylindrical metal lining 50 into the top of which the annulus 38 fits.

An imperforate cylinder 51, preferably of sheet metal, is supported from the annulus 38 by brackets 52, to be coaxial with the cylinders 35 and 36 and to surround them with a considerable space between. The top edge of the cylinder 51 is spaced below the annulus 38, preferably by a distance greater than the vertical length of the slots or apertures 48. About midway of its length the cylinder 51 has an externally attached multiperforated annular plate 53 mounted to space the cylinder 51 coaxially in the chamber defined by the cylindrical lining 50. The bottom end of the cylinder 51, which is substantially at the level of the bottom of the cup 46, has a similar but imperforate annular plate 54, which closes the annular space between the cylinders 50 and 51. The bottom end of the cylinder 51, however, is open over the whole space between it and the cup 46.

A temperature reporting device 55, e. g. a thermocouple, is mounted in the wall of the housing 22 to extend into the space below the plate 54, and is connected to suitable visual means (not shown), e. g. a milliammeter, to signal the temperature at its inner end.

In one mode of operation, assuming that a thermometer 43 is to have its calibration checked against a comparison standard thermometer 44, the apparatus will be substantially as disclosed in Fig. 1. The motor 28 is energized to drive the fan or blower 27 to circulate the air in the chamber 24 counterclockwise, and electric current is fed to the coil 29 to heat the air in the chamber 24. The handle 49 is turned to bring the apertures of the cylinder 35 into coincidence with those of the cylinder 36.

Hot air from the coil going left cannot pass down between the cylinders 50 and 51 because of the plate 54, and passes up through the perforation of the plate 53 and into the top of the cylinder 51. Here some of the air passes down between the cylinders 51 and 36 to the fan 27 and some enters the upper apertures or ports 48, circulates around the bulbs of the thermometers 43 and 44 and passes out again through the lower apertures or ports 48 and down between the cylinders 51 and 36 to the fan 27.

The temperature reporting device 55 is a convenience for an operator in keeping track of the rising temperature of the air by means of an easily observable milliammeter dial or scale instead of frequent inspection of the reading of the thermometer 44. However, when the desired temperature inside of the cylinder 36 is approximately reached, as indicated by the general air temperature reported by the device 55, observation of the standard comparison thermometer 44 is made until the exact temperature desired within the cylinder 36 is attained. The ports 48 are then closed by actuation of the handle 49, and power cut off from the coil 29 and from the motor 38.

Owing to the high specific heat of the copper composing the cylinders 35 and 36, the temperature of the relatively small volume of air, trapped and thus isolated in these cylinders from the circulating body of air by closing the ports 48, will remain substantially constant over a considerable period of time, certainly long enough to attain a heat equilibrium between the air and both thermometers. The remaining air in the chamber 24 will lose heat, more or less, to the mass of the housing 22, but it is now practically dead air, since the motor 28 and fan 27 are stopped; and also, because of the high specific heat of the copper cylinders 35 and 36, these lose temperature by loss of heat to the circumambient dead air, at a far lower rate than the air loses temperature. Hence while loss of temperature outside the cylinders, starting at say 500° F. may be of the order of 10°–25° in a given period of time, during that same period loss of temperature inside the cylinders will be only of the order of a fraction of a degree.

If a thermometer or a simultaneous batch of such is to be tested at several temperatures, the first testing may be made, as described above, at the lowest of the several prescribed temperatures, the ports 48 then opened, and the motor and heating coil again energized until the next higher prescribed temperature is attained. The ports are then again closed and the power supply to the motor and coil cut off; and so on until the complete series of tests is completed.

A liquid medium, instead of air, may be contained and circulated in the annular chamber 24, if desired, the fan or blower 27 being replaced by a suitable pump to circulate the liquid and the word "fluid" in the appended claims is intended to include both "liquid" and "gaseous." However, a gaseous medium is preferred because of the great difference in specific heat between the copper of the cylinders 35 and 36 and a gaseous medium. An inert gas, nitrogen, carbon dioxide, or the like, may also be used in place of air, since the chamber 24 is a closed one.

Under some circumstances, particularly when moderately raised temperatures are in question, the fan and motor may be omitted, and the heating coil depended upon both to heat and to circulate the medium, since the warmer medium in the right hand riser of the chamber 24 will be continuously displaced upwardly by colder medium from below.

While the cylinders 35 and 36, as disclosed, are of copper, they may be of any material effective for the purpose described, e. g. silver, porcelain, or the like. Material of high heat conductivity as well as high specific heat may be preferred as tending to reach heat equilibrium more rapidly; yet, for some purposes, material of relatively lower conductivity although of lower specific heat might be preferred.

The embodiment of the invention disclosed is illustrative and may be modified and departed from in various ways without departing from the spirit and scope of the invention as pointed out in and limited only by the appended claims.

What is claimed is:

1. In an apparatus for calibrating temperature responsive devices and comprising a tank to contain a fluid heat transferring medium, and means to alter the temperature of and to circulate the medium in the tank, a housing within the tank to receive a temperature responsive device to be calibrated, and means to open the housing to admit the medium to be circulated into and out of the housing or to close the housing to isolate a portion of the medium therein and thereby maintain the temperature of the isolated portion substantially unchanged.

2. In an apparatus for calibrating temperature responsive devices and comprising a tank to contain a fluid heat transferring medium, and means to alter the temperature of and to circulate the medium in the tank, a housing within the tank to receive a temperature responsive device to be calibrated, and means to open the housing to admit the medium to be circulated into and out of the housing or to close the housing to isolate a portion of the medium therein and thereby maintain the temperature of the isolated portion substantially unchanged, the housing being of metal having a high specific heat.

3. In an apparatus for calibrating temperature responsive devices and including a tank to contain a body of fluid heat transferring medium and means to alter the temperature of and to circulate the medium in the tank, a housing in the tank to contain a temperature responsive device to be calibrated, the said housing having ports in the walls thereof to admit the medium to be circulated into and out of the housing, and means to close the said ports at will to isolate a portion of the medium within the housing and thereby maintain the temperature of the isolated portion substantially unchanged.

4. In an apparatus for calibrating temperature responsive devices and including a tank to contain a body of fluid heat transferring medium and means to alter the temperature of and to circulate the medium in the tank, a housing made of metal of high specific heat in the tank to contain a temperature responsive device to be calibrated, the said housing having ports in the walls thereof to admit the medium to be circulated into and out of the housing, and means to close the said ports at will to isolate a portion of the medium within the housing and thereby maintain the temperature of the isolated portion substantially unchanged.

5. In an apparatus for calibrating temperature responsive devices and including a tank to contain a body of fluid heat transferring medium and means to alter the temperature of and to circulate the medium in the tank, a housing in the tank to contain a temperature responsive device to be calibrated, the said housing having a pair of nested containers having ports matchable to admit the medium to be circulated into and out of the housing, and means to move one of the nested containers with respect to the other to move the ports of one container out of matched relation to the ports of the other container to close the ports and isolate a portion of the medium within the housing and thereby maintain the temperature of the isolated portion substantially unchanged.

6. In an apparatus for calibrating temperature responsive devices and including a tank to contain a body of fluid heat transferring medium and means to alter the temperature of and to circulate the medium in the tank, a housing in the tank to contain a temperature responsive device to be calibrated, the said housing comprising a pair of nested containers made of metal of high specific heat and having ports matchable to admit the medium to be circulated into and out of the housing, and means to move one of the nested containers with respect to the other to move the ports of one container out of matched relation to the ports of the other container to close the ports and isolate a portion of the medium within the housing and thereby maintain the temperature of the isolated portion substantially unchanged.

HENRY M. WOLFSON.